United States Patent
Sorensen et al.

(10) Patent No.: US 7,697,040 B2
(45) Date of Patent: Apr. 13, 2010

(54) METHOD FOR DIGITAL PHOTO MANAGEMENT AND DISTRIBUTION

(75) Inventors: James T. Sorensen, Culver City, CA (US); David R. Alexander, Ashland, OR (US)

(73) Assignee: LightBox Network, Inc., Ashland, OR (US)

( * ) Notice: Subject to any disclaimer, the term of this patent is extended or adjusted under 35 U.S.C. 154(b) by 913 days.

(21) Appl. No.: 11/382,926

(22) Filed: May 11, 2006

(65) Prior Publication Data

US 2007/0097421 A1    May 3, 2007

Related U.S. Application Data

(60) Provisional application No. 60/731,527, filed on Oct. 31, 2005.

(51) Int. Cl.
  H04N 5/76 (2006.01)
  H04N 5/232 (2006.01)
  G03F 3/10 (2006.01)

(52) U.S. Cl. .................. 348/231.2; 348/211.2; 358/527

(58) Field of Classification Search .............. 348/211.2, 348/231.02; 358/527
  See application file for complete search history.

(56) References Cited

U.S. PATENT DOCUMENTS

| | | | |
|---|---|---|---|
| 5,806,005 A * | 9/1998 | Hull et al. .................... 455/566 |
| 6,532,345 B1 | 3/2003 | Gluck | |
| 6,571,271 B1 * | 5/2003 | Savitzky et al. ............. 709/200 |
| 6,628,325 B1 * | 9/2003 | Steinberg et al. ......... 348/211.1 |
| 6,809,762 B1 | 10/2004 | Donnelly et al. | |
| 6,985,875 B1 | 1/2006 | Wolf | |
| 7,394,966 B1 * | 7/2008 | Wada et al. ................... 386/46 |
| 7,412,656 B2 * | 8/2008 | Suzuki ........................ 715/746 |
| 7,515,175 B2 * | 4/2009 | Tanaka et al. .......... 348/207.99 |
| 2002/0147661 A1 | 10/2002 | Hatakama et al. | |
| 2003/0217118 A1 * | 11/2003 | Kobayashi et al. .......... 709/218 |
| 2004/0032498 A1 | 2/2004 | Wyn-Harris et al. | |
| 2004/0070670 A1 | 4/2004 | Foster | |
| 2004/0148231 A1 | 7/2004 | Ximenes et al. | |
| 2004/0171371 A1 | 9/2004 | Paul | |
| 2004/0202384 A1 * | 10/2004 | Hertz et al. .................. 382/305 |
| 2004/0260625 A1 | 12/2004 | Usami et al. | |
| 2005/0036034 A1 | 2/2005 | Rea et al. | |
| 2005/0146612 A1 | 7/2005 | Ward et al. | |
| 2005/0174430 A1 | 8/2005 | Anderson | |
| 2005/0197959 A1 | 9/2005 | Sanchez, III | |
| 2006/0044394 A1 | 3/2006 | Read | |

(Continued)

OTHER PUBLICATIONS

U.S. Appl. No. 12/544,165, filed Aug. 19, 2009, Inventor: Sorensen et al. (84855).

(Continued)

*Primary Examiner*—David L Ometz
*Assistant Examiner*—Dillon Durnford-Geszvain
(74) *Attorney, Agent, or Firm*—Gary D. Mann; Fitch Even Tabin & Flannery (57) ABSTRACT

Digital images are captured on a digital camera, automatically formatted, and uploaded to a server for review and collaborative modifications. An on-line web gallery is automatically generated by the server whereby low resolution versions of the images are transferred to the server and appear in the gallery within seconds from capturing the images. Among other things, a viewer located remotely from a photographer can observe new images in the gallery in real time as they are captured, place a request for post-production modifications to selected images and download a high resolution version of selected images.

3 Claims, 10 Drawing Sheets

U.S. PATENT DOCUMENTS

2006/0053473 A1 3/2006 Vau et al.
2009/0027505 A1* 1/2009 Jung et al. ............... 348/207.1

OTHER PUBLICATIONS

U.S. Appl. No. 12/465,545, filed May 13, 2009, Inventor: Sorensen et al. (84841).

U.S. Appl. No. 12/467,101, filed May 15, 2009, Inventor: Sorensen et al. (84843).

U.S. Appl. No. 12/437,369, filed May 7, 2009, Inventor: Sorensen et al. (84838).

* cited by examiner

METHOD FOR DIGITAL PHOTO MANAGEMENT AND DISTRIBUTION

CROSS REFERENCE TO RELATED APPLICATIONS

This claims priority from U.S. Provisional Patent Application No. 60/731,527, filed Oct. 31, 2005, which such application is incorporated herein by reference.

FIELD OF THE INVENTION

This relates to the distribution and management of digital images generated by a digital camera.

BACKGROUND

In some contexts, time is of the essence for photographers, especially professional photographers engaged in photo shoots involving sporting events, unfolding important news stories, fashion shows, and celebrity events. Customers or employers of photographers who provide photos or images of this subject matter can be very demanding. They often operate in a commercially competitive environment where the first to provide such images to the general public can often achieve significant financial benefits.

However there can be significant delays in providing professional images so that they can be made available to the general public. Many photographers use digital cameras to capture images at a photo shoot. At a later point in time, these images usually must be transferred from the camera to a computer located at a studio where the images can be formatted in order to modify their color, size, resolution, etc. and to add metadata. Then the photographers or their studios frequently must transfer these modified images to their customers or employers, etc. via email or other means so that they can make a selection of one or more desired images for use or purchase, and can collaborate with the photographer regarding further modifications to be made to the images (i.e., post production work). To request or discuss additional image modifications, phone calls, additional emails, etc. frequently were required.

Accordingly, there is a need to improve and facilitate the distribution and management of digital images so that high quality images can be made available to the end user more efficiently and in less time.

SUMMARY OF THE ILLUSTRATED EMBODIMENTS

Embodiments of the invention include a method of obtaining images captured on a digital camera, automatically formatting these images, and uploading them to a server for review and collaborative modifications. An on-line web gallery is automatically generated by the server whereby low resolution versions of the images captured by the camera are automatically transferred to the server and appear in the gallery within seconds from capturing the images. Among other things, the viewer therefore can observe new images as they appear in the gallery, place a request for modifications to selected images and download the high resolution version of selected images.

In one embodiment, a computer data signal is for use with a digital camera adapted to capture a plurality of digital images having a first resolution. The signal is further for use with a server in communication via a network with a first computer having a first display screen. The computer data signal is embedded in a carrier wave representing at least one program for controlling a plurality of processors to execute the following:

The plurality of digital images is automatically modified to create a plurality of modified images. Each of the plurality of modified images has a second resolution that is less than the first resolution and includes one or more of a predetermined image file format, a predetermined image parameter, and predetermined metadata. The plurality of modified images is automatically transmitted to the server. A display of the plurality of modified images is automatically generated using the server, wherein the display is of the plurality of modified images appearing in a single window on the first display screen of the first computer. The predetermined image file format, the predetermined image appearance parameter, and the predetermined metadata are determined prior to the modifying of the plurality of digital images.

In one aspect, the computer data signal is further for use with a first storage device controlled by one of the plurality of processors. The first storage device and the processor are disposed in a housing that is other than the digital camera. The housing is adapted for attachment to the digital camera or adapted for carrying on a user's body. The at least one program is further for controlling the plurality of processors to execute the following: automatically receiving the plurality of digital images from the digital camera for storage in the first storage device. Automatically modifying the plurality of digital images includes automatically modifying the plurality of digital images using the processor, and automatically transmitting the plurality of modified images includes automatically transmitting the plurality of modified images using the processor.

In another aspect, the plurality of modified images is comprised of a first set of modified images and a second set of modified images. The server is further in communication via the network with a second computer having a second display screen. A predetermined first folder location and a predetermined second folder location are located on the server and are determined prior to automatically modifying the plurality of digital images.

Automatically transmitting the plurality of modified images to the server includes automatically transmitting the first set of modified images to the server for storage in the predetermined first folder location, and automatically transmitting the second set of modified images to the server for storage in the predetermined second folder location. Automatically generating the display of the plurality of modified images using the server includes automatically generating a first display of the first set of modified images located in the first folder location and automatically generating a second display of the second set of modified images located in the second folder location. The first display is of the first set of modified images appearing in a first single window on the first screen of the first computer, and the second display is of the second set of modified images appearing in a second single window on the second screen of the second computer.

There are additional aspects to the present inventions. It should therefore be understood that the preceding is merely a brief summary of some embodiments and aspects of the present inventions. Additional embodiments and aspects are referenced below. It should further be understood that numerous changes to the disclosed embodiments can be made without departing from the spirit or scope of the inventions. The preceding summary therefore is not meant to limit the scope of the inventions. Rather, the scope of the inventions is to be determined by appended claims and their equivalents.

BRIEF DESCRIPTION OF THE DRAWINGS

These and/or other aspects and advantages of the present invention will become apparent and more readily appreciated from the following description of certain embodiments, taken in conjunction with the accompanying drawings of which.

DETAILED DESCRIPTION

The following description is of the best mode presently contemplated for carrying out the invention. Reference will be made in detail to embodiments of the present invention, examples of which are illustrated in the accompanying drawings, wherein like reference numerals refer to like elements throughout. It is understood that other embodiments may be used and structural and operational changes may be made without departing from the scope of the present invention.

Embodiments of the invention include the capturing of images on a digital camera, automatically formatting these images, and uploading them to a server for review and collaborative modifications. An on-line web gallery is automatically generated by the server whereby low resolution versions of the images are automatically transferred to the server and appear in the gallery within seconds from capturing the images. Among other things, a viewer located remotely from a photographer can observe new images in the gallery in real time as they are captured, place a request for post-production modifications to selected images and download the high resolution version of selected images.

Figure 1:
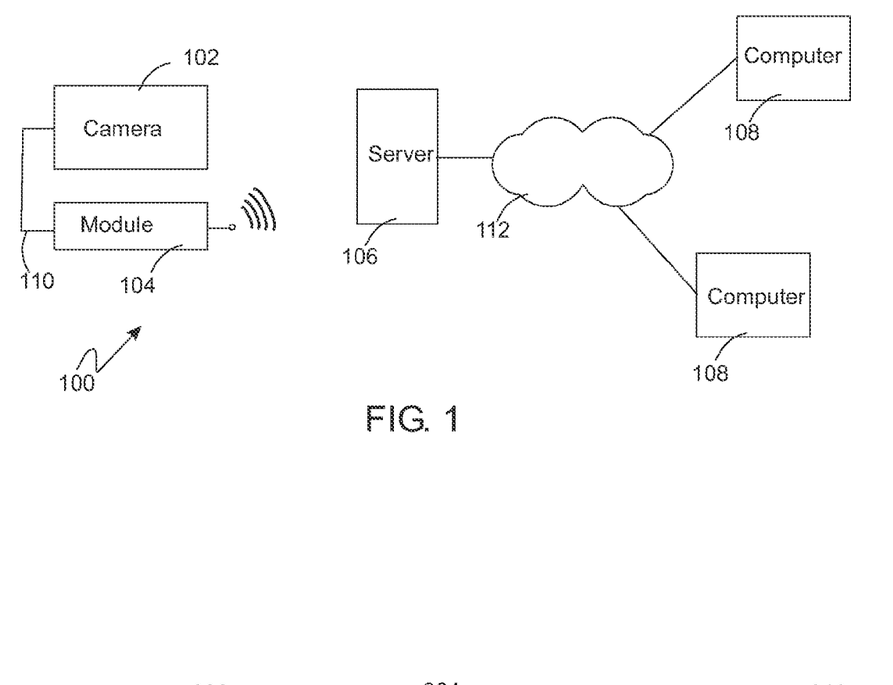
FIG. 1 is a functional block diagram of a hardware operating environment of a digital photo management system according to an embodiment of the present invention.

FIG. 1 is a functional block diagram of a hardware operating environment of a digital photo management system 100 according to an embodiment of the present invention. The management system 100 comprises a digital camera 102, a module 104, a processing server 106 and a plurality of customer or client computers 108. The module 104 communicates with the camera 102 via a FireWire connection 110. In alternative embodiments, the module 104 communicates with the camera 102 via other cabled connections, or wirelessly via infrared or radio frequency communications. The module 104, in turn, communicates with the processing server 106 wirelessly via the 802.11(g) communications protocol. In alternative embodiments, however, other communications protocols may be used as well as using wireless or wired links. Moreover, the module 104 includes cellular communication circuitry and can communicate directly with other devices via the Internet 112. The processing server 106 is connected to the Internet 112 through which the client computers 108 communicate with the processing server 106.

Figure 2A:
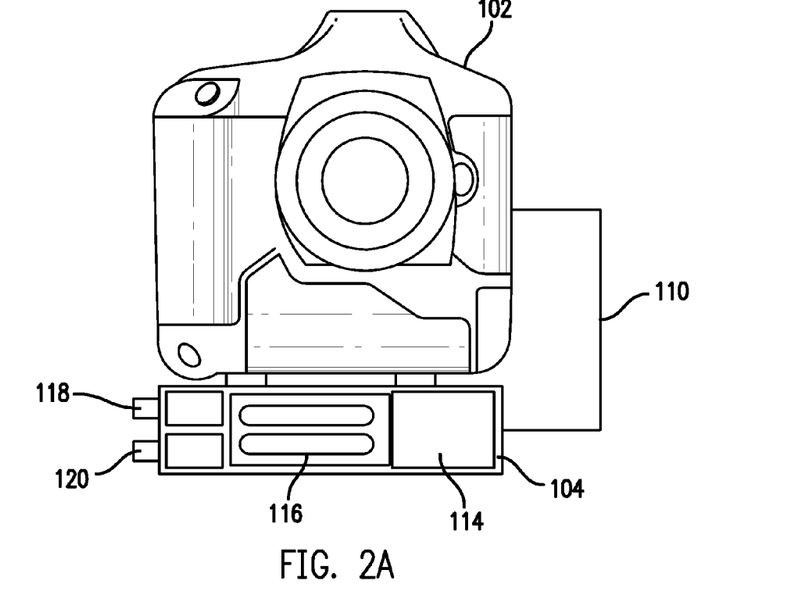
FIGS. 2A and 2B show detailed exterior front and rear views of the module of FIG. 1.
Figure 2B:
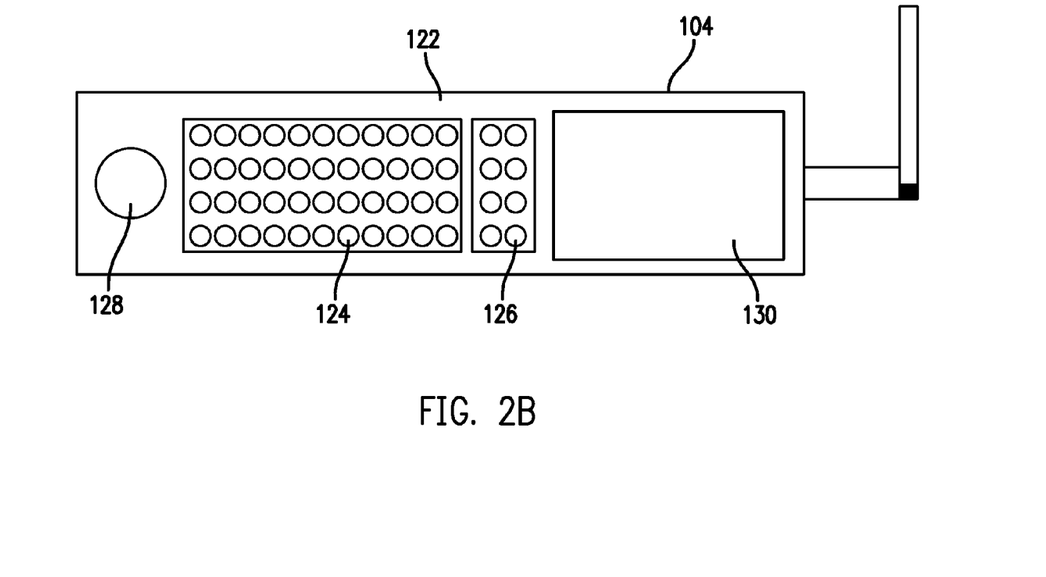

FIGS. 2A and 2B show detailed exterior front and rear views of the module 104 of FIG. 1. In this embodiment, the module 104 is attached to the camera 102 and communicates with the camera via the FireWire cable 110. The module 104 includes a compartment 114 for batteries and another section 116 for one or more mass storage devices, such as hard disk drives. Extending from one side is a first antenna 118 coupled to Wi-Fi transceiver circuitry and a second antenna 120 coupled to cellular transceiver circuitry for a wireless broadband connection to the Internet. The module 104 has a rear panel 122 that includes a keypad 124 as well as a plurality of programmable, "soft" keys or buttons 126. Also included is a scroller device 128, such as a touchpad, as well as a display screen 130.

Figure 3:
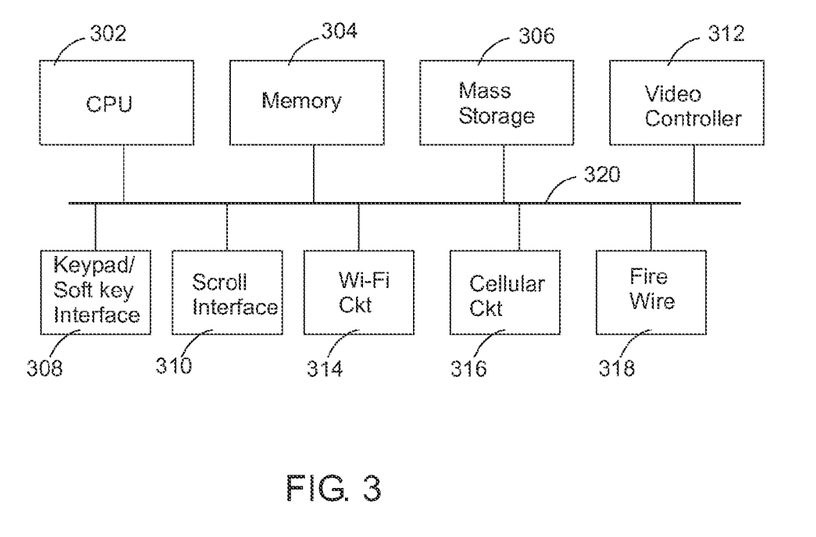
FIG. 3 is a functional block diagram of the module of FIG. 1.

FIG. 3 is a functional block diagram of the module 104 of FIG. 1. Shown are a central processing unit (CPU) 302, a main memory 304, a mass storage device 306, a keypad and soft key interface 308, a scroll device interface 310, a display screen or video controller 312, Wi/Fi transceiver circuitry 314, cellular transceiver circuitry 316, and fire-wire interface circuitry 318, all of which are coupled via a bi-directional system bus 320.

The keypad/soft key interface 308 and the scroll device interface 310 are for introducing user input to the module and for communicating that user input to the CPU 302. The keypad/soft key interface 308 includes connections to the QWERTY keypad 124 along with the programmable or "soft" keys 126 (FIG. 1). The mass storage device 306 may include one or more hard disk drives, or alternatively other forms of both fixed and removable media, such as magnetic, optical or magnetic optical storage systems or any other available mass storage technology. The bus 320 may contain, for example, a 32-bit data bus for transferring data and commands between and among the components, such as the CPU 302, the main memory 304, and the mass storage device 306.

The main memory 304 and the mass storage device 306 are used for the storage and use of an operating system program, a module photo management program, digital image data, etc. The Wi/Fi transceiver circuitry 314 and the cellular transceiver circuitry 316 permit the module 104 to selectively communicate with the processing server 106 directly or via the Internet 112 as conditions or equipment permit. Additionally, the module 104 can communicate directly with other devices via the Internet 112 without the necessity of communicating via the server 106. The FireWire interface circuitry 318 is for communications and data transfer with the digital camera 102.

The module 104 described above is for purposes of example only. Embodiments of the present invention may be implemented in any type of computer system or programming or processing environment. The module, or the components therein, may be integral with the camera. Alternatively, the module may be in the form of a housing mechanically attached directly to the camera, or alternatively still, may be carried by a user of the camera on a part of the user's body. In yet another embodiment, the module may be located apart from the camera and the camera user if the camera is in wireless communication with the module, or if there is a cable of sufficient length for wired communication. Further, in lieu of a module as such, a laptop general purpose computer, a desktop computer or other similar device may be used.

Figure 4:
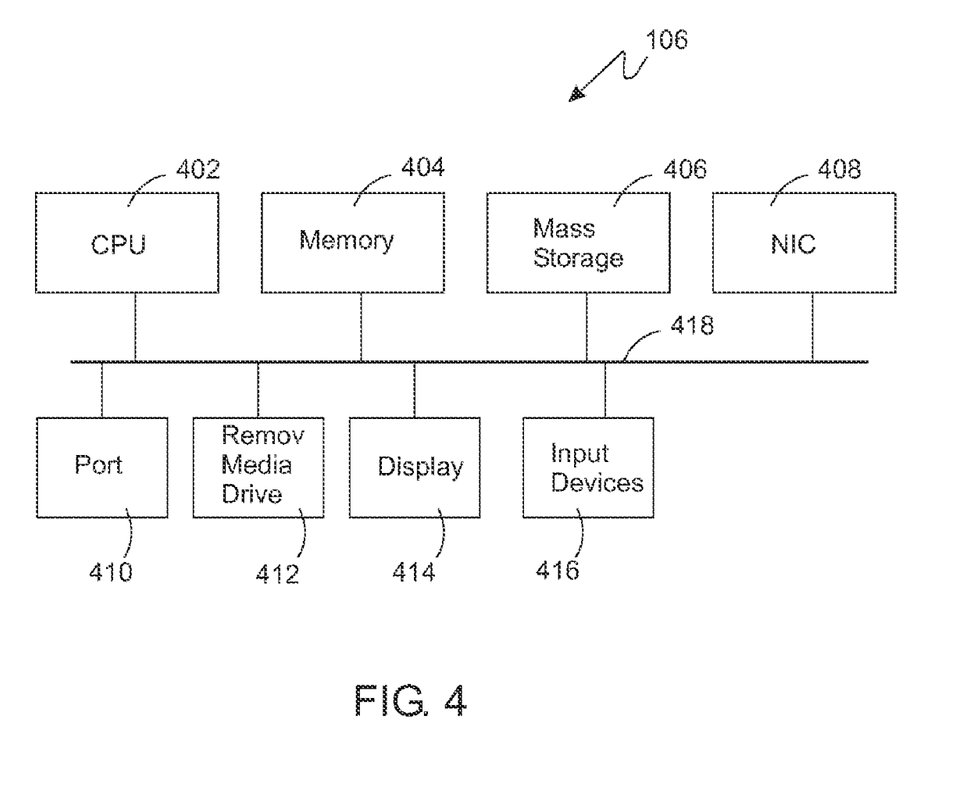
FIG. 4 is a functional block diagram of the server of FIG. 1.

FIG. 4 is a functional block diagram of the server 106 of FIG. 1 according to an embodiment of the invention. The server 106, such as a general-purpose computer, is used to receive digital images from the module 104 (FIG. 1) and provide these images in a web-page format to customers (or other authorized persons) via a network, such as the Internet. The customer's devices could be another computer, such as the computers 108 of FIG. 1, or other suitable system having a processor, a display and user input devices.

The server 106 includes a CPU 402, a system memory 404, preferably including both high speed random access memory (RAM) and non-volatile memory, such as read only memory (ROM), erasable or alterable non-volatile memory (e.g., flash memory), and a mass storage device 406, such as a hard disk drive, for storing operating system programs, data, cryptographic keys, application programs, etc. The server further includes one or more input/output devices, including, for example, a network interface 408 for communicating with other systems via a network such as the Internet. A port 410 for connecting to, e.g., a portable device, another computer, or other peripheral devices, is also included along with one or more removable media drives 412 for reading from, and/or writing to, e.g., diskettes, compact discs, DVDs, or other computer readable media. A user interface includes a display screen controller 414 and one or more input devices 416, such as keyboard and mouse. A bi-directional bus 418 interconnects the above-described components of the system.

The operation of the server 106 is controlled primarily by programs contained in the system memory 404 and executed by the CPU 402. These programs include program modules for accepting input data and for processing the input data in accordance with the embodiments of the invention described herein. For example, the program includes one or more program modules for receiving digital images from the hardware module 104 (FIG. 1), and for providing the images to authorized customers or other parties in a web page based display. One of ordinary skill in the art will appreciate, however, that some or all of the functionality of these program modules could be readily implemented in hardware without departing from the principles of the present invention.

Figure 5:
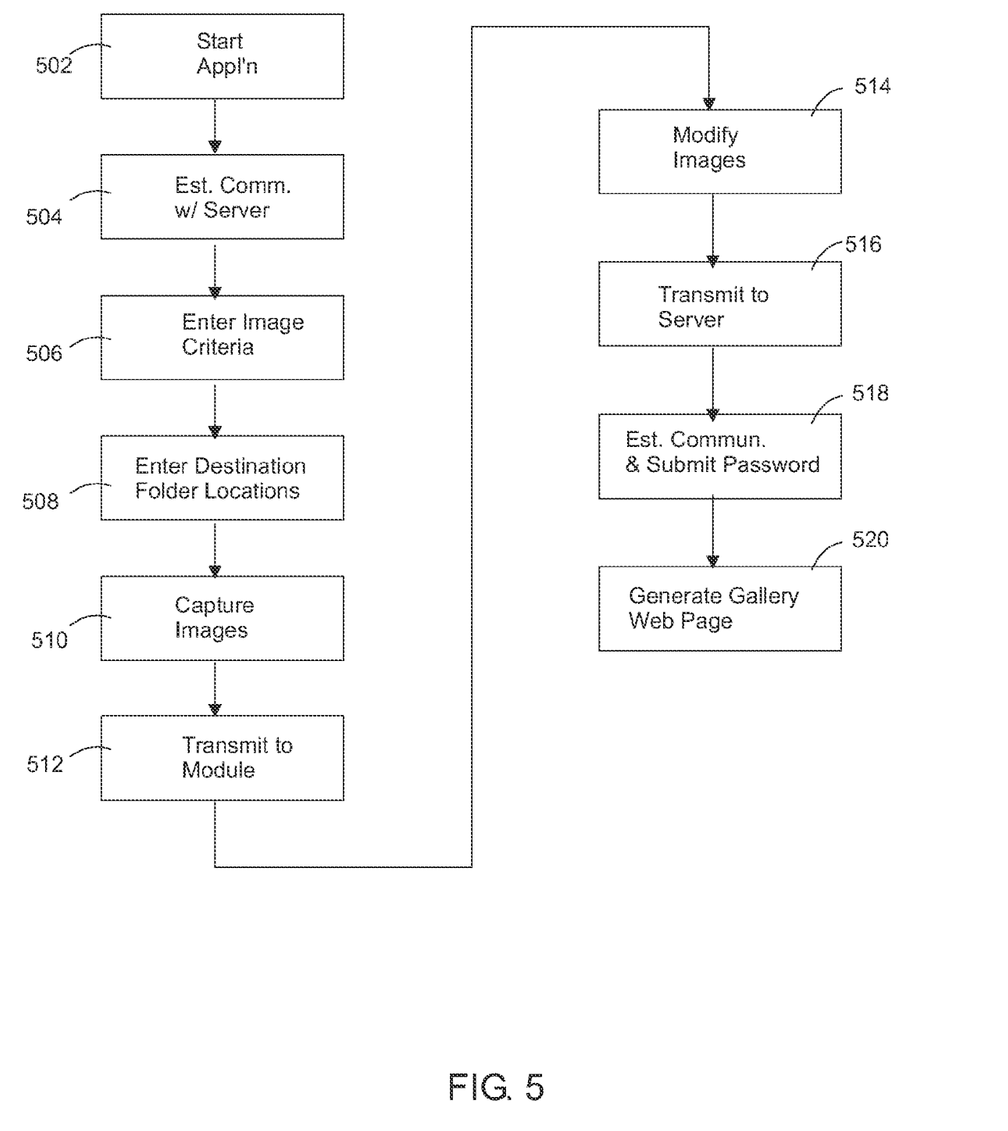
FIG. 5 shows a method for generating a web photo gallery in accordance with an embodiment of the invention.

FIG. 5 shows a method for generating a web photo gallery in accordance with an embodiment of the invention. First, the module photo management application is started, either automatically by turning on the digital camera or turning on the module, or manually via user controls on the module. (Step 502) The module establishes wireless communications with the processing server. (Step 504) Image criteria are entered into the module by selecting an image file format and image appearance parameters, and by entering certain metadata. (Step 506) The image file format can be any format used for digital images, including for example, a JPG format, a JPG2 format, a RAW format, a TIFF format, a PNG format, a GIF format, or a a BMP format. Examples of the image parameters include color balance, brightness, saturation, white balance, gamma, sharpness and contrast, and are set by the user by applying them to a test image. Examples of user-input metadata include the user's identity, a subject matter location, a subject matter identity, pricing information, and customer names and passwords for controlling access to the image data by others downstream of the user.

Next, the user enters predetermined first and second folder locations into the module (Step 508). These first and second folder locations are on the server and correspond to access by different customers or groups of customers of the user or by other authorized persons. Additionally, the user can enter another folder location on the module for the storage of images received from the camera. In alternative embodiments, the user can enter ftp folder addresses or URL addresses corresponding to locations on devices other than the server. These other addresses can be in addition to the first and second folder locations on the server or these other addresses can be in lieu of the first and second folders.

Still referring to FIG. 5, a plurality of digital images having a first resolution are captured with a digital camera. (Step 510) The images are next transmitted from the camera to the module. (Step 512) The module modifies the digital images by converting them to a lower resolution and by applying the predetermined image file format, image parameters, and metadata. (Step 514) Then, the modified images are transmitted to the server and stored in the first folder location on the server. (Step 516) A customer's computer establishes communication with the server via a network, such as the Internet, and the customer submits a password. (Step 518) If the password is correct, the server generates a web page display of all of the modified images so that they appear in a single window on the customer's computer screen. (Step 520) Additional copies of the modified images are also transmitted to any other folder or URL destination addresses that have been entered by the user during module configuration. Once communication is established, further images captured by the camera are automatically processed as in steps 512-516 and 520 and appear in real time on the customer's screen.

The user is not limited to capturing images for receipt by only one customer. Prior to the photo shoot, the user can enter a predetermined second folder location on the server. During the shoot, the user can cause the module to transmit subsequent images to the second folder that is dedicated to another customer (or group of customers). The server requires a different password associated with the second folder prior to generating a display of the images so that they appear in a single window on the second customer's computer screen.

By assigning server destination folders (or other URL addresses or ftp folder addresses) to programmable soft keys or buttons on the module, the user can actuate them for very rapid image transfer assignments. When subsequent photos are shot, the image data is then automatically sent to one or to more pre-defined destination addresses. Moreover, with the use of the soft keys the user can rapidly change the destination of future shots during the middle of a photo shoot.

Figure 6:
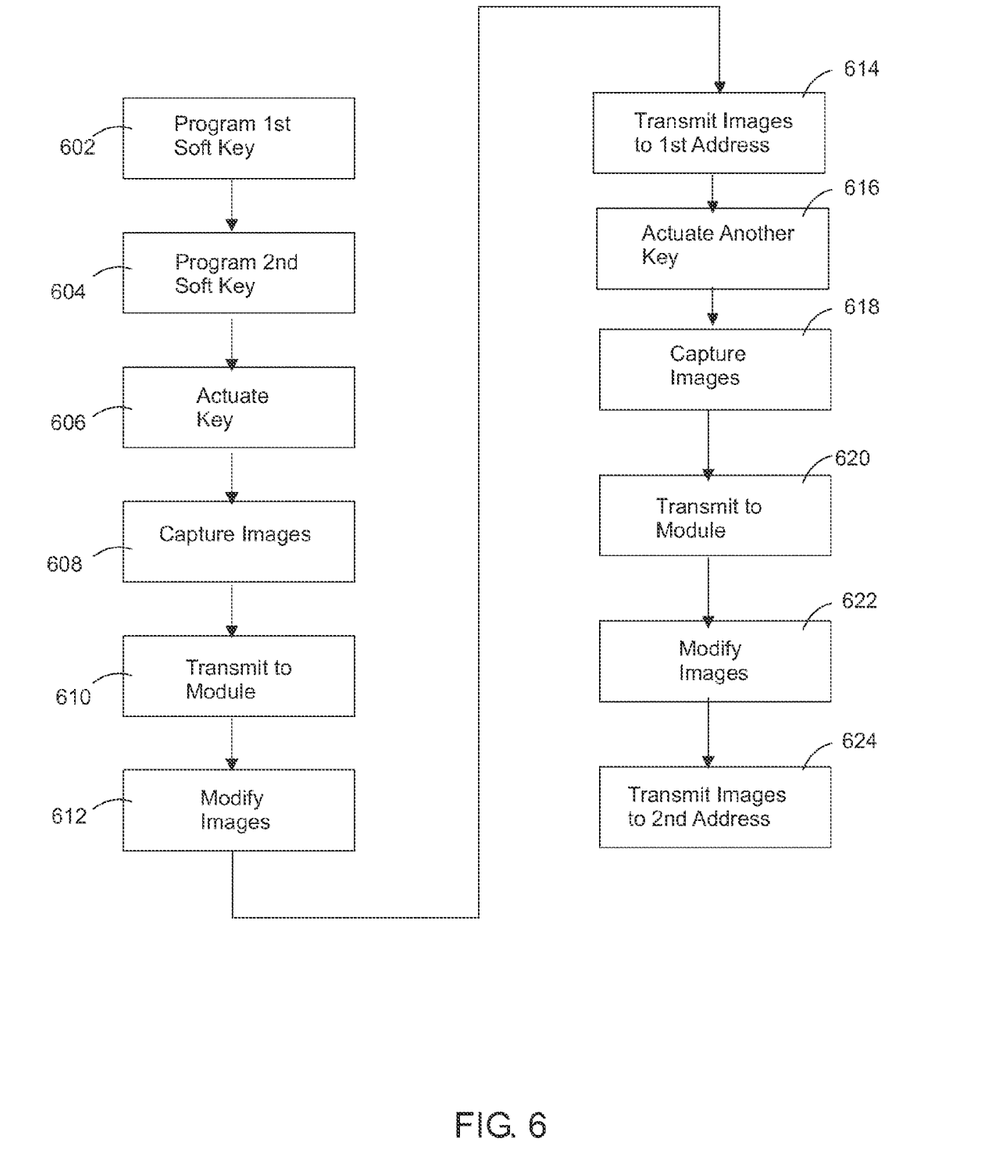
FIG. 6 shows a method for using module soft keys for the distribution of images in accordance with an embodiment of the invention.

FIG. 6 shows a method for using the module soft keys for the distribution of images in accordance with an embodiment of the invention. First, the user programs one of the module's programmable or soft keys to correspond to a first address. (Step 602) Then a second soft key is programmed to correspond to a second address. (Step 604) The process continues for other soft keys that the user may desire to program. The addresses can be folder locations on the server or ftp folders or URL addresses corresponding to other computers on the Internet. Then, when the user is ready to begin the photo shoot, the user manually actuates the soft key associated with one of the addresses that is desired for the destination of the upcoming photos. (Step 606)

The user then captures a plurality of digital images having a first resolution with a digital camera. (Step 608) The images are automatically transmitted from the digital camera to the module for storage therein. (Step 610) The module modifies the images by reducing their resolution and by applying predetermined image parameters, a predetermined image file format, and by associating predetermined metadata with the images (Step 612). Then, the module automatically transmits the modified images to the address (or addresses) associated with the selected soft key. (Step 614)

When the user desires to change the destination of a subsequent group of photos to be taken during the photo shoot, the user manually actuates another soft key on the module. (Step 616) Then the user captures a second plurality of digital images having the first resolution. (Step 618) The images are automatically transmitted from the digital camera to the module for storage therein. (Step 620) The module modifies the images by reducing their resolution and by applying the predetermined image parameters, the predetermined image file format and by associating predetermined metadata with the images. (Step 622) Then, the module automatically transmits the modified images to the address (or addresses) associated with the other, selected soft key. (Step 624)

The addresses can correspond to one or more folders on the server. The addresses can also correspond to ftp folders or URL addresses of customer computers or any other computers in communication directly with the module via a network or with the server via the network.

As previously mentioned, the destination addresses that can be programmed into the module include one or more folders on the user's server. As photos are shot, the image data is modified as described above and low resolution versions of the image data (along with associated metadata) are wirelessly transmitted to the server destination folder. Upon receipt of this image data and associated metadata in the folder, the server creates a web-based gallery of these photos for viewing by authorized persons who can access this gallery via the Internet. This is accomplished automatically, so that as a photo shoot occurs, the image data is processed as described above, sent to the server folder, and then made available to customers or other authorized users on the web page photo gallery. The authorized users provide a user name and password via their web browser to access the images, and a screen will appear in the user's web browser in which low resolution versions of the photos will appear as they are being taken during the photo shoot.

Figure 7:
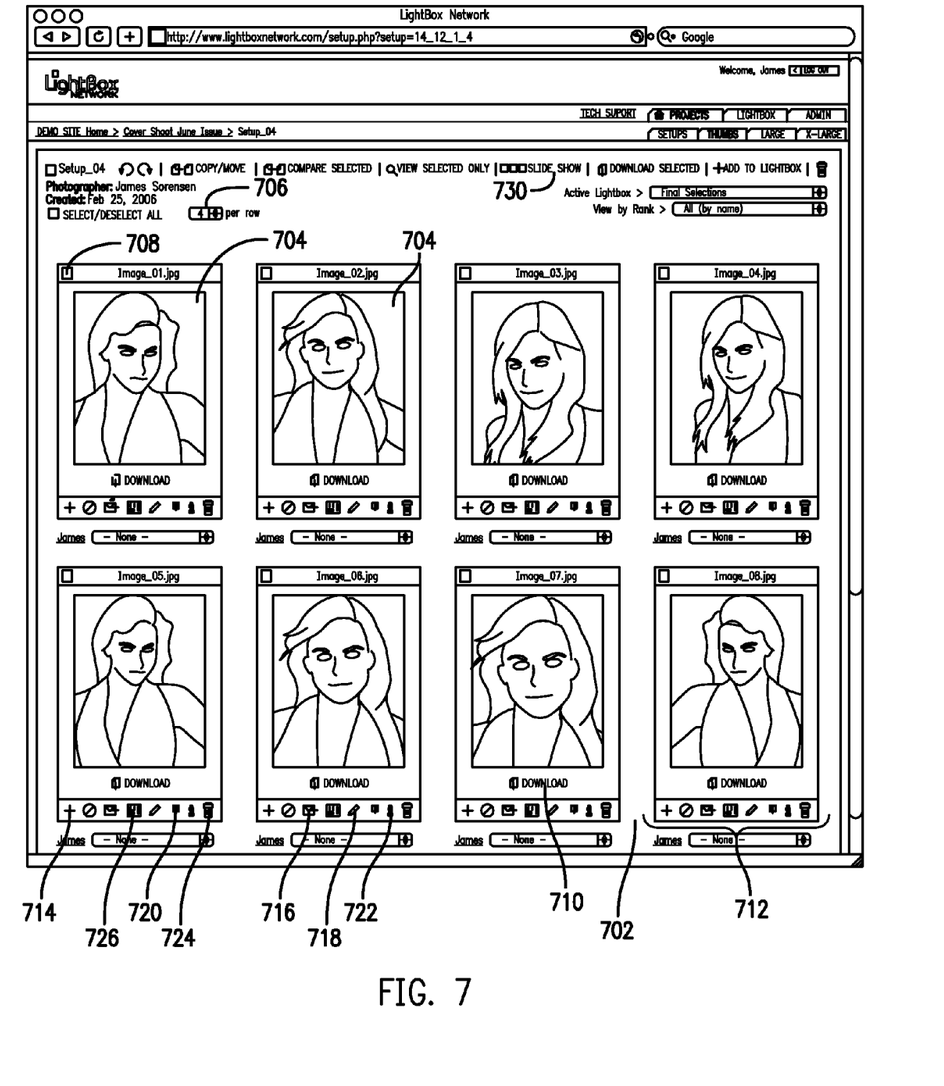
FIG. 7 is an illustration of a web-based gallery displayed on a display screen in accordance with an embodiment of the invention.

FIG. 7 is an illustration of a web-based gallery displayed on a monitor or display screen in accordance with an embodiment of the invention. The photographer's server provides the customer (or other authorized persons) with a browser web page or gallery 702 having a plurality of images 704 appearing on a single screen within a matter of seconds after they are shot. The gallery 702 includes an image sizing box 706 that sets the number of images that can appear per row on the screen, and thus the size of each image 704 as it appears in the gallery. Associated with each image are a selection checkbox 708, a download link or button 710, and a plurality of tool links or buttons 712. The selection checkbox 708 is for selection of one or more images on the gallery for later use, such as group image downloading, moving to another folder on the server, etc. The download link 710 launches a separate window for downloading a low resolution copy of the selected image to the customer's computer.

The tool links 712 include an addition link 714 for adding the image to a separate folder on the server, a transmittal link 716 for sending the image via email to another person, a notes link 718 for allowing the customer to provide text notes to the photographer regarding that image, a pop up link 720 that launches a window showing a full-sized view of that image, a metadata link 722 that allows the customer to see all or some of the metadata for that image, a delete link 724 that removes that image from the gallery page, and a retouch link 726 for providing image alteration instructions to the photographer.

Figure 8:
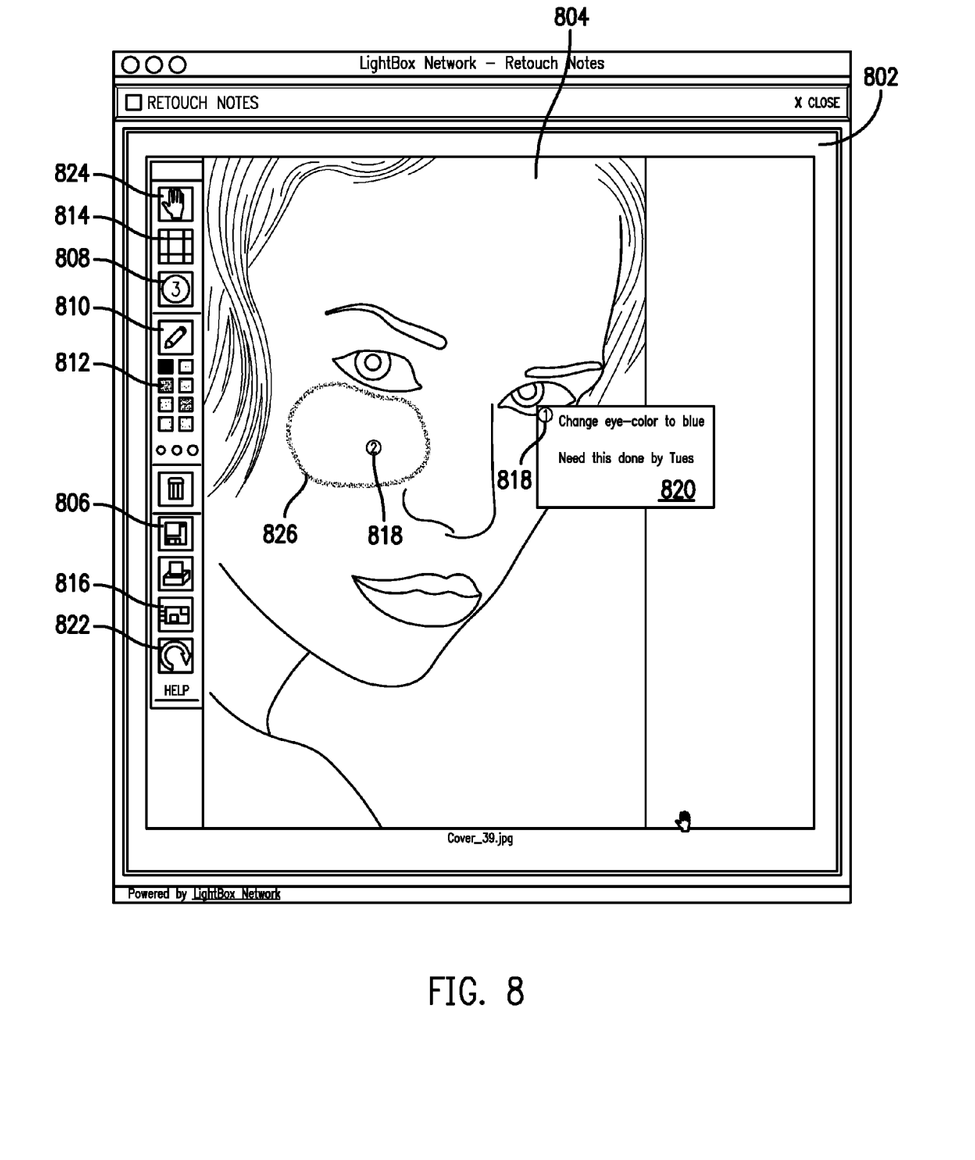
FIG. 8 is an illustration of a web-based window for the collaborative editing of a selected digital image in accordance with an embodiment of the invention.

When the retouch link 726 is selected, a retouch window is launched as shown in FIG. 8. The retouch window 802 provides an editable, on-line version of the selected image 804 and includes a plurality of retouch tools and related tools for use by the customer. These include a save button 806, a note tool 808, a pen tool 810 with an associated color pallet 812, a crop marker tool 814, an email link 816, a selection tool 824 and a refresh button 822. The note tool 808 has a drag and drop feature so that a note can be dragged to a specific location on the image after which a notation area 820 is automatically opened with the cursor active in the area for entering text metadata, i.e., comments, requests, etc. intended for the photographer. The notation area 820 can be closed by using the selection tool 824 and clicking on a notation number 818 associated with each note so that only the notation number 818 remains on the image. The selection tool 824 also is used to move the location of the notation number 818 on the image 804. The pen tool 810 allows marks, arrows, etc. to be drawn directly on the image, such as the mark shown at reference numeral 826. The color pallet 812 provides a selection of colors for the marks made by the pen tool. The crop marker tool 814 allows the customer to place markings on the image to show the image portions where removal is desired. When the email link 816 is activated, a small email window appears into which one or more email addresses may be entered. The email window (not shown) includes a comments field into which a message to the email addressees may be inserted and a send link, that when activated sends a viewable only version of the image that contains all of the notations along with any message. Although not shown in FIG. 8, an alternative embodiment can include a zoom icon or tool that is used to display a portion of the image in a closer, high resolution view to enable more detailed notes or annotations to be placed on the image.

When the save button 806 is clicked, all pen tool notations, crop tool notations and notes (i.e., the retouch annotation data) are saved for this image, whereupon these changes become viewable by all other persons who have access to this version of this image containing the retouch annotation data when those persons click the refresh button 822 on their screens. Thus this retouch window feature can be used collaboratively. A plurality of users can be granted access to this retouch window for any given image, and all of their collective notes and marks can be seen by others in the group. Retouching and post production work on photos therefore can be accomplished in a much shorter amount of time. It will be appreciated that while the embodiment of FIG. 8 shows a save button and a refresh button for transmitting and receiving the retouch annotation data, alternative embodiments do not need these buttons for these functions. That is, alternative embodiments provide automatic displays of retouch annotation data as they are being created so that all viewing users can view them without the need to manually click the save or refresh buttons, or take any other similar actions. The retouch annotation data can comprise an overlay of text data and marker notes/lines having coordinates for their location over the image. In an alternative embodiment, however, the image and overlay annotation data can be "flattened" into an annotated image for transmission to authorized users.

While the figures in this specification show embodiments of the invention that employ web pages displayed on computer screens having links for entering commands, data, etc., it will be appreciated that this is not so limited. Computer displays other than web-based displays may be used as well and may include other control icons or buttons or links.

Figure 9:
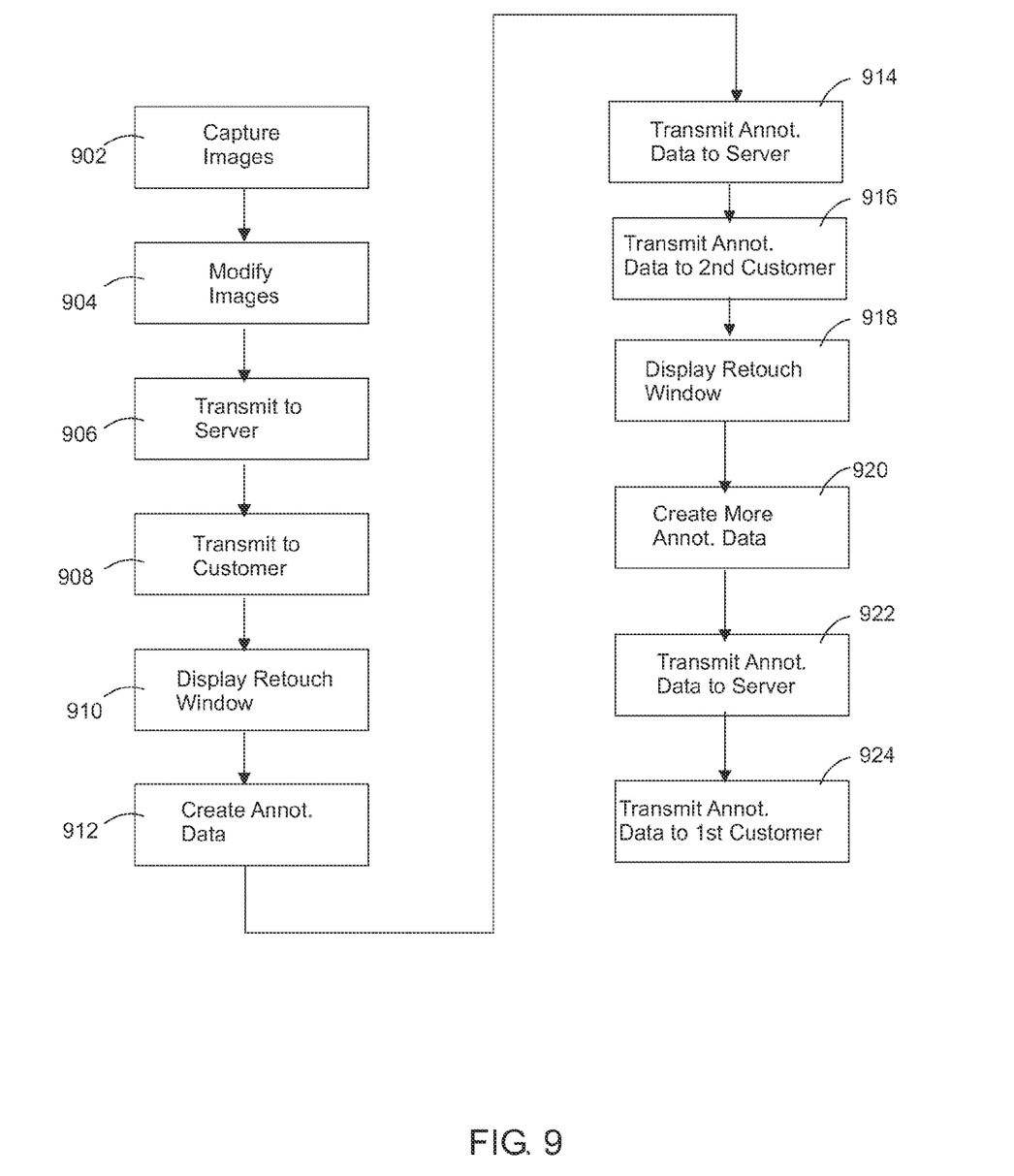
FIG. 9 shows a method for the collaborative editing of a selected digital image in accordance with an embodiment of the invention.

FIG. 9 shows a method for use of the retouch feature for the collaborative editing of a selected digital image according to an embodiment of the invention. First a plurality of digital images having a first resolution is captured with a digital camera. (Step 902) Then the images are automatically modified to create a plurality of modified images having a lower resolution. (Step 904) These modified images are then automatically transmitted to a server. (Step 906) The server, in turn, transmits the modified images via a network to a customer's computer, if the proper password is supplied. (Step 908)

The modified images are automatically displayed on the customer's computer monitor along with a retouch icon associated with each image. When the customer selects a retouch icon associated with one of the modified images, another window is displayed that shows an editable image corresponding to the selected modified image and that shows a plurality icons corresponding to image retouch tools. (Step 910) The user marks the editable image using one or more of the retouch tools to create an overlay of annotation data superimposed over the editable image. (Step 912) When the user is completed marking the editable image, the user selects a "save" icon which causes the annotation data to be transmitted from the computer to the server. (Step 914)

If another customer located at another computer has access rights, the annotation data is automatically transmitted from the server to the other customer's computer. (Step 916) The editable image with annotation data overlay are displayed on the customer's monitor along with the plurality icons corresponding to image retouch tools. (Step 918) The other customer then marks the editable image using the retouch tools to create a second set of annotation data overlaying the editable image. (Step 920) When the other customer has completed marking, the "save" icon is selected whereupon the second set of annotation data is transmitted from the second computer to the server (Step 922) where it is made available for viewing and further annotation by the first customer or by any other customer with access rights. (Step 924)

Figure 10:
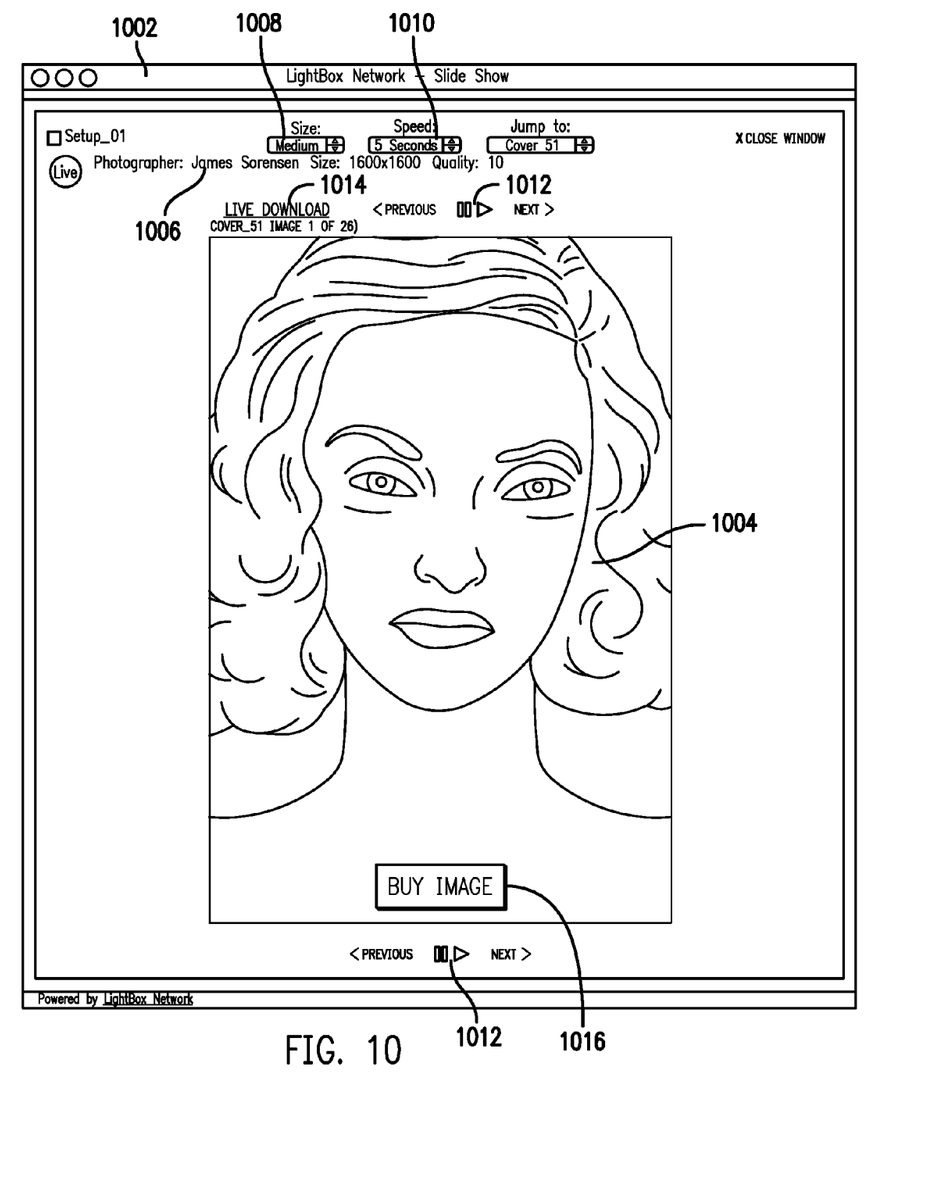
FIG. 10 is an illustration of a slide show window according to an embodiment of the invention.

The gallery window of FIG. 7 also includes a slide show link 730 that, when activated, launches a separate slide show window. FIG. 10 illustrates an exemplary slide show window 1002 according to an embodiment of the invention. This window 1002 includes a single, but larger-sized image 1004 than those appearing in the gallery window 702 of FIG. 7. Each of the images in the gallery window 702 appears automatically, one at a time, in the slide show window 1002 at predetermined time intervals. At this point the customer can view the images in this window 1002 as the system presents those images currently existing in the gallery page folder on the server. Moreover, as the photographer shoots additional photos, they also appear in the slide show window 1002 in real time.

The slide show window 1002 includes the identity of the photographer 1006 conducting the shoot, an image size control box 1008, a speed control box 1010, image navigation controls 1012, a high resolution download link 1014, and a purchase image link 1016. The image size control box 1008 allows the customer to set the size of each image 1004 as it appears on the screen by selecting small, medium or large settings. The speed control box 1010 sets a predetermined time interval for controlling the speed at which one image replaces another image in the window 1002. The image navigation controls 1012 permit the customer to stop and start the automatic image presentation and to manually scroll to previous and following images. The purchase image link 1016 allows the customer to place a purchase order to the photographer for the image 1004. The high resolution download link 1014 permits the customer to obtain a high resolution version of the image 1004 that currently is being viewed in the slide show window 1002. The high resolution download link 1014 and the name of the photographer 1006 do not appear in the window 1002 for an image unless that photographer is currently connected to the server and a high resolution download is possible for that image.

When a customer clicks the high resolution download link 1014, a request is placed for the server and the module to fulfill either in real time during a live photo shoot, or at a later point in time. When the request is placed, the server communicates with the module and the high resolution version of the requested image is located in the appropriate folder within the module. The module then wirelessly transmits the high resolution version of the image to the server that, in turn, transmits the high resolution image to the customer via the Internet. When the photographer has included pricing information during the setup, the customer is automatically charged for the high resolution image. By initially transmitting low resolution versions of images to the server, and later only transmitting those high resolution versions of images that are requested by customers, bandwidth is more efficiently used and the delivery of images to customers is achieved at a faster rate.

In an alternative embodiment, a plurality of slide show windows, each of which having the features described above in connection with FIG. 10 can be displayed on a single screen. Each of the slide show windows presents a series of images taken by different photographers while the images are being shot and further presents the name of each photographer. Thus one editor or customer can monitor, edit and purchase in real time the production of a plurality of photographers in geographically remote locations, or in different positions within the same venue.

Figure 11:
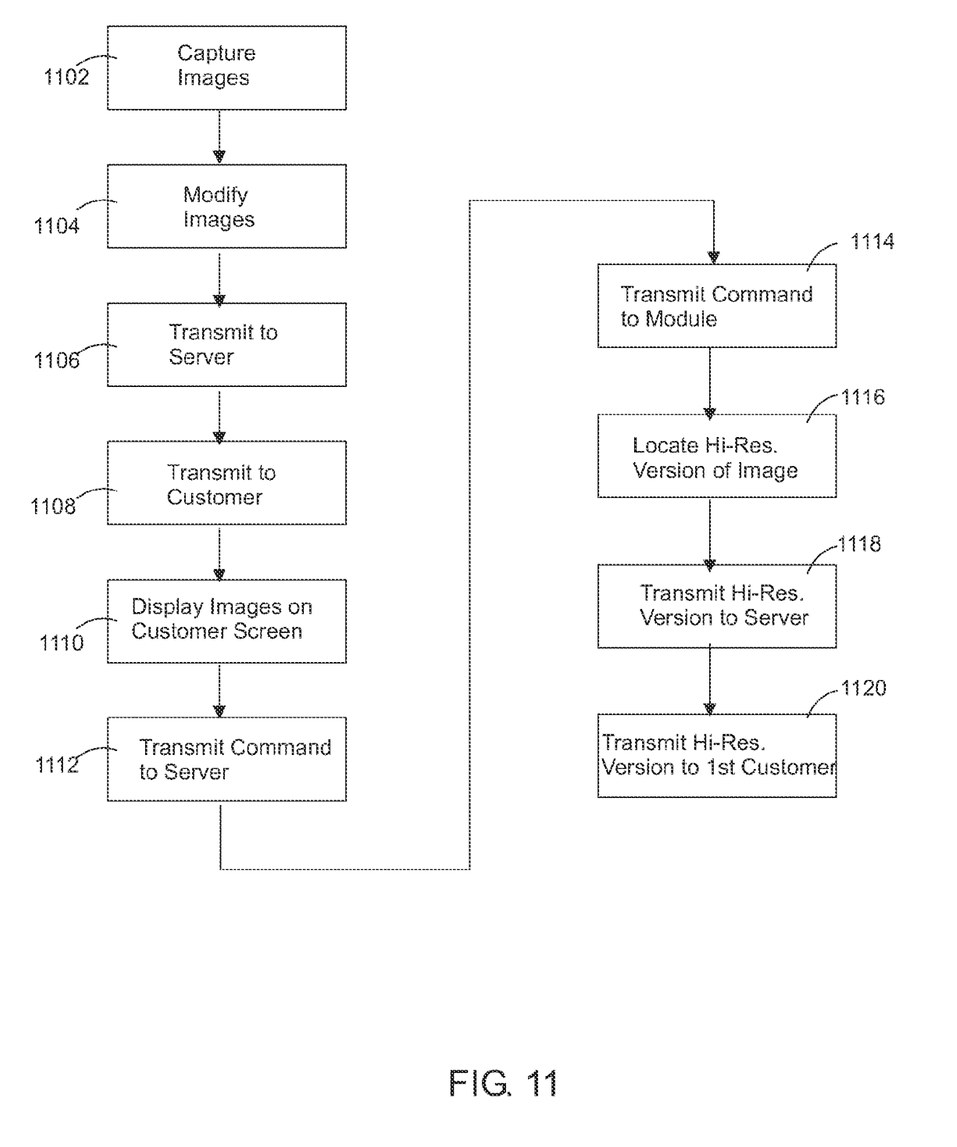
FIG. 11 shows a method by which a high resolution version of an image is distributed according to an embodiment of the invention.

FIG. 11 shows a process by which a high resolution version of an image is provided to a customer according to an embodiment of the invention. First, a plurality of digital images having a first resolution is captured with a digital camera. (Step 1102) The images are automatically modified by reducing their resolution and applying other image criteria to create a plurality of modified images. (Step 1104) Then the modified images are transmitted to a server. (Step 1106) The server, in turn, transmits the modified images via a network to a customer's computer if the proper password is supplied. (Step 1108) The modified images are displayed on the monitor of the customer's computer along with a download icon. (Step 1110) If the customer selects a download icon associated with one of the modified images, a download command is transmitted to the server (Step 1112) and then from the server to the module. (Step 1114) The module locates the original image having the higher resolution that corresponds to the selected modified image (Step 1116) and transmits that original image to the server (Step 1118), that in turn, transmits the original image to the customer's computer. (Step 1120)

In the above described embodiments of FIGS. 5, 6, 9 and 11, the digital images as captured are modified by the module by reducing their resolution and modifying formats, applying image parameters and adding metadata. In alternative embodiments, however, the digital images are not modified to a lower resolution. Rather images having the original resolution are transmitted to the customer's computer either directly or via the server. In applications where bandwidth is not an issue, this may be desirable. In other alternative embodiments, the application of the predetermined file format, image parameters and metadata is either not accomplished at all or is not accomplished by the module, but rather is accomplished by the server.

Thus it can be seen that pursuant to embodiments of the invention, digital images are captured on a digital camera, automatically formatted, and uploaded to a server for review and collaborative modifications. An on-line web gallery is automatically generated by the server whereby low resolution versions of the images are transferred to the server and appear in the gallery within seconds from capturing the images. Among other things, a viewer located remotely from a photographer can observe new images in the gallery in real time as they are captured, place a request for post-production modifications to selected images and download a high resolution version of selected images.

While the description above refers to particular embodiments of the present invention, it will be understood that many modifications may be made without departing from the spirit thereof. The claims are intended to cover such modifications as would fall within the true scope and spirit of the present invention. The presently disclosed embodiments are therefore to be considered in all respects as illustrative and not restrictive, the scope of the invention being indicated by the claims rather than the foregoing description, and all changes which come within the meaning and range of equivalency of the claims are therefore intended to be embraced therein.

What is claimed is:

1. A method of managing digital images, comprising:
    entering one of a predetermined image file format, a predetermined image appearance parameter, and predetermined metadata;
    entering a predetermined first folder address and a predetermined second folder address using a first processor, wherein the predetermined first and second folder addresses correspond respectively to predetermined first and second folder locations on a server;
    capturing a plurality of digital images with a digital camera after the entering of the predetermined first folder address and the predetermined second folder address and after the entering of the one of the predetermined image file format, the predetermined image appearance parameter, and the predetermined metadata, wherein each of the plurality of digital images has a first resolution;
    automatically transmitting the plurality of digital images from the digital camera to a first storage device using the first processor coupled to the first storage device via a bus,
        wherein the first processor and the first storage device are disposed in a housing that is other than the digital camera, and
        wherein the housing is one of adapted for attachment to the digital camera and adapted for carrying on a user's body;
    automatically modifying the plurality of digital images using the first processor to create a plurality of modified images, wherein each of the plurality of modified images has a second resolution that is less than the first resolution and includes the one of the predetermined image file format, the predetermined image appearance parameter, and the predetermined metadata,
        wherein the plurality of modified images is comprised of a first set of modified images and a second set of modified images;
    automatically transmitting the first set of modified images to the server for storage in the predetermined first folder location using the first processor;
    automatically transmitting the second set of modified images to the server for storage in the predetermined second folder location using the first processor;
    automatically generating a first display of the first set of modified images located in the first folder location using the server; and
    automatically generating a second display of the second set of modified images located in the second folder location using the server,
        wherein the first display is of the first set of modified images appearing in a first single window on a first screen of a first computer in communication with the server over a network, and
        wherein the second display is of the second set of modified images appearing in a second single window on a second screen of a second computer in communication with the server over the network.

2. The method of claim 1 wherein the predetermined image file format is one of a JPG format, a JPG2 format, a RAW format, a TIFF format, a PNG format, a GIF format, and a BMP format,
    wherein the predetermined image appearance parameter is one of a color balance, a brightness, a saturation, a gamma, a sharpness, a contrast, and a white balance, and
    wherein the predetermined metadata is one of a user's identity, a subject matter location, a subject matter identity, and pricing information.

3. The method of claim 1 wherein automatically generating the first display of the first set of modified images includes automatically generating the first display of the first set of modified images upon receipt by the server of a first predetermined password from the first computer, and wherein automatically generating the second display of the second set of modified images includes automatically generating the second display of the second set of modified images upon receipt by the server of a second predetermined password from the second computer.

* * * * *